(12) United States Patent
Ishizuka

(10) Patent No.: US 7,440,197 B2
(45) Date of Patent: Oct. 21, 2008

(54) IMAGE FORMING LENS AND PORTABLE INFORMATION TERMINAL

(75) Inventor: Tetsuro Ishizuka, Tokorozawa (JP)

(73) Assignee: Fu Tech Corporation, Tokyo (JP)

( * ) Notice: Subject to any disclaimer, the term of this patent is extended or adjusted under 35 U.S.C. 154(b) by 0 days.

(21) Appl. No.: 11/703,973

(22) Filed: Feb. 8, 2007

(65) Prior Publication Data

US 2007/0279766 A1    Dec. 6, 2007

(30) Foreign Application Priority Data

Jun. 1, 2006    (JP)    ............................. 2006-154048

(51) Int. Cl.
*G02B 3/02*    (2006.01)
*G02B 9/00*    (2006.01)

(52) U.S. Cl. ........................ 359/708; 359/718; 359/739; 359/796

(58) Field of Classification Search ................. 359/708, 359/717, 718, 738, 739, 740, 796
See application file for complete search history.

(56) References Cited

U.S. PATENT DOCUMENTS 4,964,703 A * 10/1990 Suda et al. .................. 359/652

FOREIGN PATENT DOCUMENTS

JP    2006-010990    1/2006

* cited by examiner

*Primary Examiner*—Ricky L Mack
*Assistant Examiner*—Jack Dinh
(74) *Attorney, Agent, or Firm*—Jordan and Hamburg LLP

(57) ABSTRACT

The image forming lens comprises a stop and a single lens placed in this order from the object side, wherein if the object-side surface of the single lens having paraxial curvature radii to form biconvex surfaces is referred to as the first surface while the image-side surface is referred to as the second surface, both the first surface and the second surface of said single lens have an aspherical shape, and the focal length f, the distance d0 along the axis from the stop to the first surface of the single lens, the paraxial curvature radius R1 of the first surface and the distance L0 along the axis from the stop to the focal points satisfy the following conditional expressions:

$0.18 < d0/f < 0.25$    (1)

$0.60 < R1/f < 0.85$    (2)

$1.40 < L0/f < 1.55$.    (3)

5 Claims, 2 Drawing Sheets

SPHERICAL ABERRATION   ASTIGMATISM   DISTORTION

IMAGE FORMING LENS AND PORTABLE INFORMATION TERMINAL

BACKGROUND OF THE INVENTION

1. Field of the Invention

This invention relates to an image forming lens comprising a stop and a single lens, particularly an image forming lens to be used in an imaging apparatus containing such an imaging element as CCD or CMOS, and also relates to a portable information terminal having this image forming lens.

2. Description of the Related Art

In the multi-media field in recent years, electronic cameras and cell phones respectively containing an imaging lens are highly required to be extremely smaller in size, lighter in weight and lower in cost. So the image forming lens is also desired to be extremely smaller in size, lighter in weight, lower in cost and higher in resolution.

For achieving a lower cost, smaller size and lighter weight, an image forming lens consisting of a single lens is advantageous, but it is difficult to correct various aberrations. Especially the lens has the problem that the performance in the circumference of the lens is likely to deteriorate easily. However, various image forming lenses respectively consisting of a single lens have been proposed. One of the proposed image forming lenses is described in Patent Document 1 (JP2006-10990A).

The image forming lens of the invention described in Patent Document 1 consists of a stop and a single lens having paraxial curvature radii to form biconvex surfaces, which are placed in this order from the object side. If the object-side surface of said single lens is referred to as the first surface while the image-side surface is referred to as the second surface, both said first surface and said second surface have an aspherical shape, and the paraxial curvature radius of the first surface, the thickness of the lens, the distance between the first surface to the image forming face in terms of air length, the focal length, the distance from the stop to the first surface, Abbe constant, etc. are set to meet predetermined conditions. It is insisted that if this constitution is employed, an image forming lens of low cost, small size, light weight, good telecentricity and high performance suitable for an electrophotographic apparatus can be produced.

[Patent document 1] JP2006-10990A

However, the image forming lens described in said Patent Document 1 has the disadvantage that since it is intended to use such a resin as a norbornene-based polymer or polymethyl methacrylate in addition to glass as the material constituting the lens, the lens cannot be used in an imaging apparatus requiring heat resistance at about 250° C.

Moreover, the lens is required to be further improved in the correction of chromatic aberration, which is an inevitable problem with a single lens.

The present invention has been made in view of the above-mentioned situation. The object of this invention is to provide an image forming lens and a portable information terminal that are lower in cost, smaller in size and lighter in weight, and yet shortened in the overall optical length especially including the mechanical parts such as stop, good in telecentricity on the image face side, well corrected in chromatic aberration, high in performance and excellent in heat resistance.

SUMMARY OF THE INVENTION

The image forming lens according to a first aspect of this invention comprises a stop and a single lens placed in this order from the object side, wherein if the object-side surface of the single lens having paraxial curvature radii to form biconvex surfaces is referred to as the first surface while the image-side surface is referred to as the second surface, both said first surface and said second surface of said single lens have an aspherical shape, and the focal length f, the distance d0 along the axis from said stop to the first surface of said single lens, the paraxial curvature radius R1 of said first surface of said single lens and the distance L0 along the axis from said stop to the focal points satisfy the following conditional expressions:

$$0.18 < d0/f < 0.25 \tag{1}$$

$$0.60 < R1/f < 0.85 \tag{2}$$

$$1.40 < L0/f < 1.55 \tag{3}$$

Further, in a second aspect of the invention, in the image forming lens according to the first aspect of invention, if the height at which the light intersects the surface is referred to as h, the aspherical shapes of said first and second surfaces of said single lens satisfy the following conditions:

said first surface is such that its curvature radius becomes gradually smaller compared to the spherical surface with the paraxial curvature radius and that at h=0.42f, it satisfies the following equation: 0.03<(difference between the spherical surface with the paraxial curvature radius and the aspherical shape of the first surface)/f<0.05 (4)

said second surface is such that it curvature radius becomes gradually larger compared to the spherical shape with the paraxial curvature radius, that it changes in shape from a convex surface to a concave surface at about h=0.32f, and that at h=0.42f, it satisfies the following equation: 0.14<(difference between the spherical surface with the paraxial curvature radius and the aspherical shape of the second surface)/f<0.18 (5)

In a third aspect of the invention, in the image forming lens according to the first or second aspect of the invention, as moldable glass material for minimizing the chromatic aberration and for acquiring heat resistance, FK5 (S-FSL5) satisfying the following conditional expressions is used:

$$1.48 < nd < 1.52 \tag{6}$$

$$vd > 68 \tag{7}$$

In a fourth aspect of the invention, in the image forming lens according to the first or second aspect of the invention, as moldable glass material for minimizing the chromatic aberration and for acquiring heat resistance, BK7 (L-BSL7) satisfying the following conditional expressions is used:

$$1.48 < nd < 1.52 \tag{6}$$

$$vd > 63 \tag{8}$$

According to a fifth aspect of the invention, a portable information terminal comprises the image forming lens of any one of the first to fourth aspects of the invention as a component of the imaging optical system of a camera's functional portion.

According to the first aspect of the invention, the image forming lens comprises a stop and a single lens placed in this order from the object side, wherein if the object-side surface of the single lens having paraxial curvature radii to form biconvex surfaces is referred to as the first surface while the image-side surface is referred to as the second surface, both said first surface and said second surface of said single lens have an aspherical shape, and the focal length f, the distance d0 along the axis from said stop to the first surface of said single lens, the paraxial curvature radius R1 of said first surface of said single lens and the distance L0 along the axis from said stop to the focal points satisfy the following conditional expressions:

$$0.18 < d0/f < 0.25 \quad (1)$$

$$0.60 < R1/f < 0.85 \quad (2)$$

$$1.40 < L0/f < 1.55 \quad (3)$$

So, an image forming lens lower in cost, smaller in size, lighter in weight and shortened in the optical overall length, and yet good in telecentricity, high in performance and excellent in heat resistance can be produced.

Further, according to the second aspect of the invention, in the image forming lens of the first aspect of the invention, if the height at which the light intersects the surface is referred to as h, the aspherical shapes of said first and second surfaces of said single lens satisfy the following conditions:

said first surface is such that its curvature radius becomes gradually smaller compared to the spherical surface with the paraxial curvature radius and that at h=0.42f, it satisfies the following equation: 0.03<(difference between the spherical surface with the paraxial curvature radius and the aspherical shape of the first surface)/f<0.05 (4)

said second surface is such that it curvature radius becomes gradually larger compared to the spherical shape with the paraxial curvature radius, that it changes in shape from a convex surface to a concave surface at about h=0.32f, and that at h=0.42f, it satisfies the following equation: 0.14<(difference between the spherical surface with the paraxial curvature radius and the aspherical shape of the second surface)/f<0.18 (5)

So, an image forming lens especially capable of sufficiently correcting the respective aberrations in a range from the center to the edge of the image field in addition to having the effect of the subject matter of the first aspect of the invention can be produced.

Furthermore, according to the third aspect of the invention, in the image forming lens of the first or second aspect of the invention, wherein as moldable glass material for minimizing the chromatic aberration and for acquiring heat resistance, FK5 (S-FSL5) satisfying the following conditional expressions is used:

$$1.48 < nd < 1.52 \quad (6)$$

$$vd > 68 \quad (7)$$

So, an image forming lens very small in dispersion at varying wavelengths, capable of correcting various aberrations very well including the chromatic aberration, which has so far been difficult to correct, and excellent in heat resistance can be produced.

Still furthermore, according to the fourth aspect of the invention, in the image forming lens of the first or second aspect of the invention, as moldable glass material for minimizing the chromatic aberration and for acquiring heat resistance, BK7 (L-BSL7) satisfying the following conditional expressions is used:

$$1.48 < nd < 1.52 \quad (6)$$

$$vd > 63 \quad (8)$$

So, an image forming lens small in dispersion at varying wavelengths, capable of correcting various aberrations very well including the chromatic aberration, which has so far been difficult to correct, excellent in heat resistance and low in cost can be produced.

Still furthermore, according to the fifth aspect of the invention, a portable information terminal comprises the image forming lens of any one the first to fourth aspects of the invention, as a component of the imaging optical system of a camera's functional portion. So, a portable information terminal excellent in portability for the user and capable of photographing high quality images can be produced, since it contains an imaging optical system having an F-number of about 4, is sufficiently small in size and light in weight, can be corrected well in various aberrations and is high in performance.

DESCRIPTION OF THE PREFERRED EMBODIMENTS

The image forming lens of this invention and the portable information terminal containing the image forming lens as the imaging optical system of an imaging functional portion are described below in detail as embodiments of this invention referring to drawings.

Figure 1:
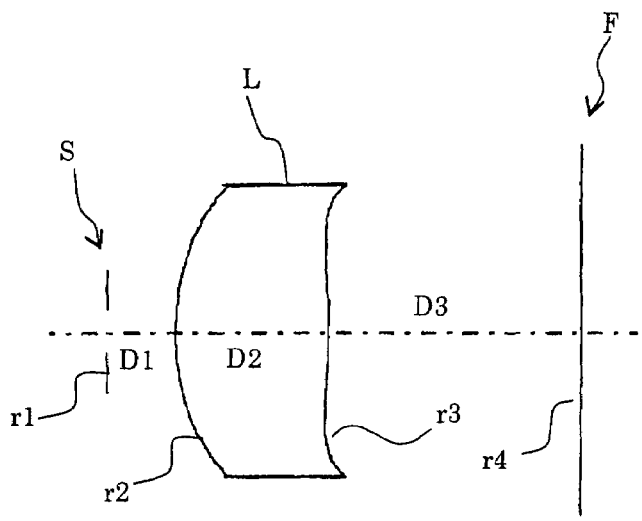
FIG. 1 is a sectional view showing the constitution of the image forming lens presented as Example 1 of this invention.
Figure 3:
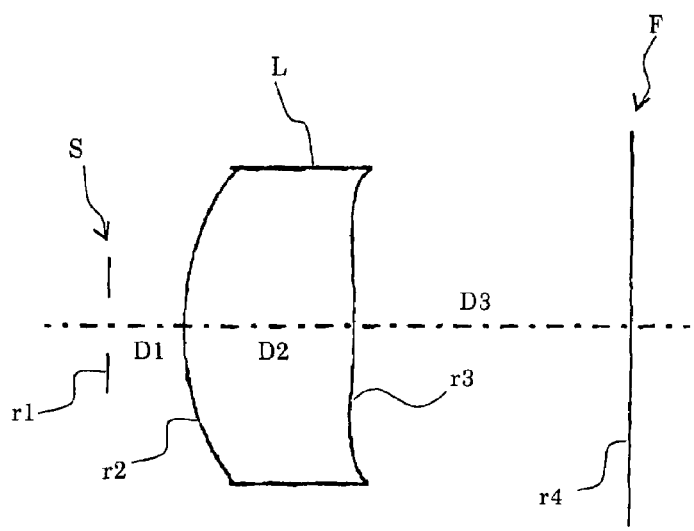
FIG. 3 is a sectional view showing the constitution of the image forming lens presented as Example 2 of this invention.

FIG. 1 is a sectional view showing the constitution of the image forming lens presented as the first embodiment of this invention. FIG. 3 is a sectional view showing the constitution of the image forming lens presented as the second embodiment of this invention.

Meanwhile, FIG. 1 has a configuration corresponding to the image forming lens presented as Example 1 of this invention, and FIG. 3 has a configuration corresponding to the image forming lens presented as Example 2 of this invention, respectively described later.

As shown in FIG. 1, the image forming lens as the first embodiment of this invention comprises a stop (aperture-stop) S and a single lens L having paraxial curvature radii to form biconvex surfaces or has them placed in this order from the object side, and they are supported and fixed by an adequate support member (or support frame), etc. In FIG. 1, F denotes an image forming face to have an image formed by the image forming lens L, and on this face, a light receiving face of a light receiving element such as CCD or CMOS is placed.

The image forming lens of this invention with the aforesaid constitution has the following features.

First, the stop S is installed apart from the single lens L on the object side of said optical system, in order to ensure that the exit pupil is kept away from the light receiving element such as CCD with the intension of making the optical system resemble a telecentric optical system in which every luminous flux may be incident on the light receiving element perpendicularly.

The distance between the stop S and the single lens L is required to satisfy the following conditional expression:

$$0.18 < d0/f < 0.25 \quad (1)$$

where f is the focal length, and d0 is the distance along the axis from the stop S to the first surface of the single lens L.

If the ratio d0/f is not larger than the lower limit shown in the expression (1), the optical system does not resemble an adequate telecentric optical system, and if the ratio is not smaller than the upper limit, the overall length including the stop position is so large as to lower the brightness at the edge of the image field.

Next, the single lens L is explained below.

If the object-side surface of the single lens L is referred to as the first surface r2 while the image-side surface is referred to as the second surface r3, both the first surface r2 and the second surface r3 have a paraxial curvature to form a biconvex surface. Both the first surface r2 and the second surface r3 of the single lens L are aspherical. The single lens L is required to satisfy the following conditional expression (2):

$$0.60 < R1/f < 0.85 \quad (2)$$

where R1 is the paraxial curvature radius of the first surface r2.

If the paraxial curvature radius R1 of the first surface r2 of the single lens L is not larger than the lower limit of the expression (2), the spherical aberration deteriorates, and the abaxial coma and telecentricity also deteriorate. Further, if it is not smaller than the upper limit, the overall length of the optical system becomes long uselessly.

Moreover, to perform sufficient aberration correction and to shorten the overall length of the optical system while maintaining the necessary performance, it is desired to satisfy the following expression (3):

$$1.40 < L0/f < 1.55 \quad (3)$$

where L0 is the distance along the axis from the stop S to the focal points.

Meanwhile, for sufficiently correcting the respective aberrations in a range from the center to the edge of the image field, the aspherical shapes of the first and second surfaces of the single lens L should satisfy the following conditions, where the height at which the light intersects the surface is referred to as h.

The first surface is such that its curvature radius becomes gradually smaller compared to the spherical surface with the paraxial curvature radius and that at h=0.42f, it satisfies the following equation: 0.03<(difference between the spherical surface with the paraxial curvature radius and the aspherical shape of the first surface)/f<0.05 (4)

The second surface is such that it curvature radius becomes gradually larger compared to the spherical shape with the paraxial curvature radius, that it changes in shape from a convex surface to a concave surface at about h=0.32f, and that at h=0.42f, it satisfies the following equation: 0.14<(difference between the spherical surface with the paraxial curvature radius and the aspherical shape of the second surface)/f<0.18 (5)

If said expressions (4) and (5) are satisfied, the lens can have good lens performance in the entire image field and especially can be balanced between the upper light and the lower light in the transverse aberration.

Further, as the glass material (moldable glass material) of the single lens L used as a component of the image forming lens of this invention, FK5 (S-FSL5) produced by HOYA Corp. that satisfies the following conditional expressions should be used in order to minimize the chromatic aberration and acquire heat resistance.

$$1.48 < nd < 1.52 \quad (6)$$

$$vd > 68 \quad (7)$$

In aberration correction, a one-piece lens has a problem with chromatic aberration. In order to minimize the chromatic aberration in addition to correcting other various aberrations, the material is required to be small in dispersion at varying wavelengths and must satisfy the aforesaid expressions (6) and (7).

Moreover, as the glass material (moldable glass material) of the single lens L used as a component of the image forming lens of this invention, BK7 (L-BSL7) produced by HOYA Corp. that satisfies the following conditional expressions should be used to minimize the chromatic aberration and acquire heat resistance.

$$1.48 < nd < 1.52 \quad (6)$$

$$vd > 63 \quad (8)$$

In aberration correction, a one-piece lens has a problem with chromatic aberration. In order to minimize the chromatic aberration in addition to correcting other various aberrations, the material is required to be small in dispersion at varying wavelengths and must satisfy the aforesaid expressions (6) and (8).

FK5 (S-FSL5) is used as the moldable glass material because it has a dispersion value of 68 or more and is very small in dispersion, while BK7 (L-BSL7) is used is because it has a dispersion value of 63 or more and is available at the lowest price among the materials with small dispersion.

Examples showing particular numerical values based on the above-mentioned embodiments of this invention are described in detail below.

FIGS. 1 and 3 are sectional views showing the shapes of the image forming lenses presented as Examples 1 and 2 of this invention.

Thus, particular examples of this invention are described below.

The aberrations in the examples are sufficiently corrected, as described later. It can be seen from the examples described below that an image forming lens constitution as in this invention can provide an image forming lens that has a wide half view angle of 32° or more, small size, light weight, an F-number of about 4, good telecentricity, corrected chromatic aberration, high performance and excellent heat resistance.

The symbols in the following examples are defined as follows:

f: focal length in the entire system

F: F-number

ω: half view angle

R: curvature radius

D: surface separation nd: refractive index vd: Abbe constant k: conic constant of aspherical surface a: fourth-order aspherical coefficient b: sixth-order aspherical coefficient c: eighth-order aspherical coefficient d: tenth-order aspherical coefficient With the z axis as the optical axis direction, y axis as the direction perpendicular to the optical axis, and k, a, b, c and d as aspherical coefficients the aspherical shapes in the examples (including Examples 1 and 2) are defined by the following expression (9):

$$Z = \frac{(1/R) \cdot y^2}{1 + \sqrt{1 - (1+k)(1/R)^2 \cdot y^2} +} + a \cdot y^4 + b \cdot y^6 \qquad (9)$$
$$c \cdot y^8 + d \cdot y^{10}$$

For the spherical aberrations in the aberration diagrams described below, curves G, C, F and D indicate g-line (435.84 mμ), C-line (656.28 mμ), F-line (486.13 mμ) and d-line (587.56 mμ), respectively.

Example 1

FIG. 1 shows the constitution of the optical system of the image forming lens presented as Example 1 of this invention.

The image forming lens shown in FIG. 1 has the stop S and the single lens L placed in this order from the object side. Though not shown in the drawing, a light receiving element (imaging element) such as CCD or CMOS is placed at the position of the image forming face F, and a cover glass or optical filter may be placed in front of it as required.

They are supported by an adequate support frame or imaging apparatus body (for example, the main body of an electronic camera or cell phone). Further, in FIG. 1, a face number is given to each optical face. In this case, r1 indicates the face of the stop S perpendicular to the optical axis; r2, the first surface of the single lens L; r3, the second surface of the single lens L; and r4, the image forming face F.

The single lens L1 has paraxial curvature radii to form biconvex surface and has a positive refractive power. Both the first surface r2 and the second surface r3 have an aspherical shape.

In Example 1, the focal length f of the entire system is 1.894 mm; F-number being 4.0; half view angle ω being 32.31°; back focus bf being 1.500 mm; and the glass material being FK5 (S-FSL5) produced by HOYA Corp.

The properties of the respective optical faces are as shown in Table 1.

TABLE 1

| | f = 1.894 mm bf = 1.500 mm F/4.0 Material FK5 | | | |
|---|---|---|---|---|
| Face number: r | Radius (R) | surface separation (D) | Refractive index (nd) | Abbe constant (vd) |
| r1 (φ0.654 aperture stop) | Inf | 0.4 | | |
| r2 (first surface)* | 1.356 | 0.9 | 1.485 | 69.8 |
| r3 (second surface)* | −2.227 | 1.5 | | |
| r4 (image forming face) | Inf | | | |

In Table 1, the asterisked optical faces, i.e. the first surface r2 and the second surface r3 of the single lens L, in the face number column are aspherical, and the parameters of the aspherical surfaces in the expression (9) are as shown in the following Table 2.

TABLE 2

| | (Aspherical coefficients) | | | | |
|---|---|---|---|---|---|
| Face number: r | k | a | b | c | d |
| r2 | 1.121 | 0.3272 | −1.001 | 1.566 | −1.038 |
| r3 | −373 | −0.4992 | 3.359 | −6.302 | 5.239 |

In Example 1, the values of the parameters in the conditional expressions (1) to (7) described before are as follows:

| $d0/f = 0.2111$ | Conditional expression (1) |
| $R1/f = 0.7159$ | Conditional expression (2) |
| $L0/f = 1.478$ | Conditional expression (3) | difference between the spherical surface with the paraxial curvature radius and the aspherical shape of the first surface=0.03907    Conditional expression (4)

difference between the spherical surface with the paraxial curvature radius and the aspherical shape of the second surface=0.1552    Conditional expression (5)

| nd=1.485 | Conditional expression (6) |
| νd=69.8 | Conditional expression (7) |

Therefore, in Example 1, the values of the parameters in the conditional expressions (1) to (7) described before conform to the ranges of the respective conditional expressions.

Figure 2:
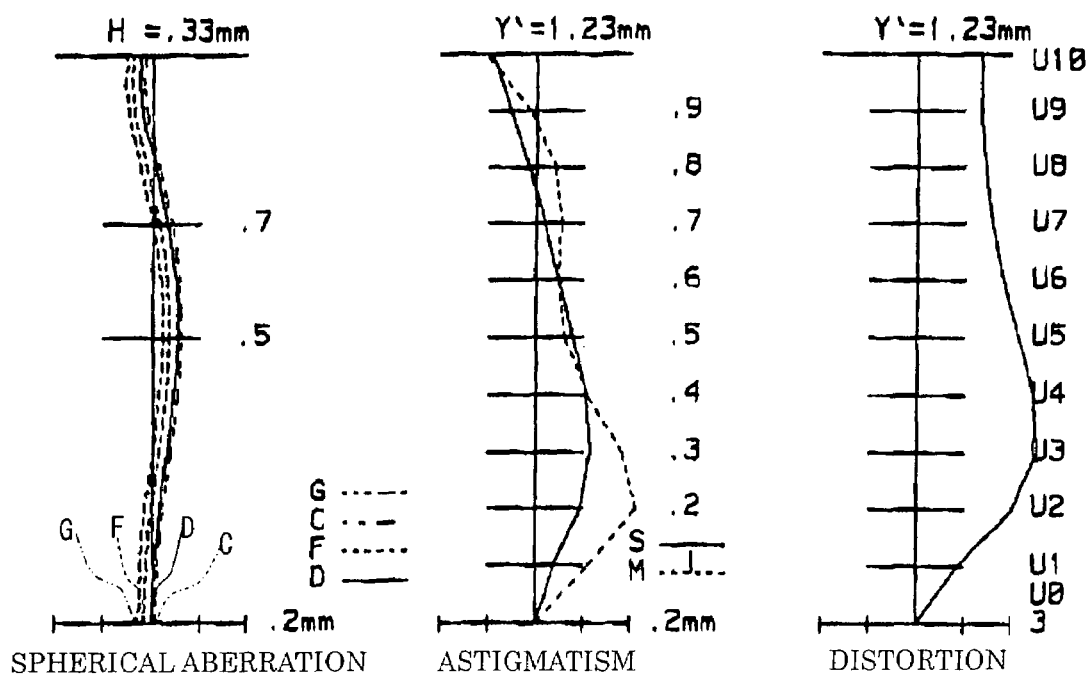
FIG. 2 shows the curves of respective aberrations of the image forming lens presented as Example 1 of this invention.

FIG. 2 shows the curves of the spherical aberration, astigmatism and distortion of the above-mentioned image forming lens shown in FIG. 1 presented as Example 1. For the spherical aberrations in the aberration curves, curve G, C, F and D indicate g-line, C-line, F-line and d-line, respectively. In the aberration curves, each solid line indicates a sagittal ray, and each broken line indicates a meridional ray.

According to the aberration curves of FIG. 2, the above-mentioned image forming lens with the constitution shown in FIG. 1 presented as Example 1 of this invention have appropriately corrected or reduced aberrations, and as can be seen from the aberration curves, the chromatic aberration is also corrected or reduced well.

Example 2

FIG. 3 shows the constitution of the image forming lens presented as Example 2 of this invention.

The image forming lens shown in FIG. 3 has the stop S and the single lens L placed in this order from the object side. Though not shown in the drawing, a light receiving element (imaging element) such as CCD or CMOS is placed at the position of the image forming face F, and a cover glass or optical filter may be placed in front of it as required.

They are supported by an adequate support frame or imaging apparatus body (for example, the main body of an electronic camera or cell phone). Further, in FIG. 3, a face number is given to each optical face. In this case, r1 indicates the face of the stop S perpendicular to the optical axis; r2, the first surface of the single lens L; r3, the second surface of the single lens L; and r4, the image forming face F.

The single lens L1 has paraxial curvature radii to from biconvex surfaces and has a positive refractive power. Both the first surface r2 and the second surface r3 have an aspherical shape.

Meanwhile, the respective reference symbols of FIG. 3 are used independently from those of FIG. 1. The same symbols are used to avoid complication due to the increase in the number of digits of each symbol, and are not intended to indicate the same parts as those of Example 1.

In Example 2, the focal length f of the entire system is 1.911 mm; F-number being 4.0; half view angle ω being 32.36°; back focus bf being 1.500 mm; and the glass material being BK7 (L-BSL7) produced by HOYA Corp.

The properties of the respective optical faces are as shown in Table 3.

TABLE 3 f = 1.911 mm bf = 1.500 mm F/4.0 Material BK7

| Face number: r | Radius (R) | surface separation (D) | Refractive index (nd) | Abbe constant (νd) |
|---|---|---|---|---|
| r1 (φ0.654 aperture stop) | Inf | 0.4 | | |
| r2 (first surface)* | 1.48 | 0.9 | 1.515 | 63.9 |
| r3 (second surface)* | −2.33 | 1.5 | | |
| r4 (image forming face) | Inf | | | |

In Table 3, the asterisked optical faces, i.e. the first surface r2 and the second surface r3 of the single lens L, in the face number column are aspherical, and the parameters of the respective aspherical surfaces in the expression (9) are as shown in the following Table 4.

TABLE 4

(Aspherical coefficients)

| Face number: r | k | a | b | c | d |
|---|---|---|---|---|---|
| r2 | 1.987 | 0.489 | −2.068 | 3.951 | −2.974 |
| r3 | −777 | −0.755 | 5.153 | −11.05 | 9.361 |

In Example 2, the values of the parameters in the conditional expressions (1) to (6) and (8) described before are as follows:

$d0/f=0.209$  Conditional expression (1)

$R1/f=0.774$  Conditional expression (2)

$L0/f=1.465$  Conditional expression (3)

difference between the spherical surface with the paraxial curvature radius and the aspherical shape of the first surface=0.04479  Conditional expression (4)

difference between the spherical surface with the paraxial curvature radius and the aspherical shape of the second surface=0.16147  Conditional expression (5)

$nd=1.515$  Conditional expression (6)

$vd=63.9$  Conditional expression (8)

Therefore, in Example 2, the values of the parameters in the conditional expressions (1) to (6) and (8) described before conform to the ranges of the respective conditional expressions.

Figure 4:
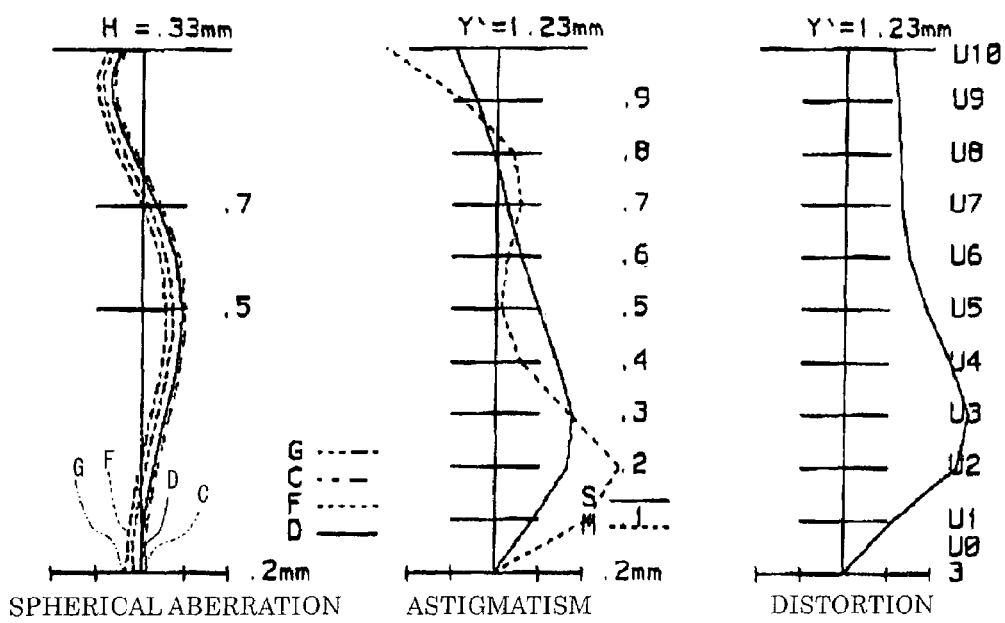
FIG. 4 shows the curves of respective aberrations of the image forming lens presented as Example 2 of this invention.

FIG. 4 shows the curves of the spherical aberration, astigmatism and distortion of the above-mentioned image forming lens shown in FIG. 3 presented as Example 2. For the spherical aberration in the aberration curves, curve G, C, F and D indicate g-line, C-line, F-line and d-line, respectively. In the aberration curves, each solid line indicates a sagittal ray, and each broken line, a meridional ray.

According to the aberration curves of FIG. 4, the above-mentioned image forming lens with the constitution shown in FIG. 3 presented as Example 2 of this invention have appropriately corrected or reduced aberrations, and as can be seen from the aberration curves, the chromatic aberration is also corrected or reduced well.

Described below is an embodiment, in which a camera's functional portion employing the image forming lens of this invention is installed in a portable information terminal such as an electronic camera, PDA (personal data assistant) or cell phone. Such a portable information terminal contains substantially the same function as that of a camera, though somewhat different in appearance, so the image forming lens of this invention can be employed in the portable information terminal.

A publicly known electronic camera or the functional portion of a portable information terminal is briefly described below.

An electronic camera has an image forming lens and a light receiving element as an area sensor such as a CCD (charge coupled device) imaging element and is constituted in such a manner that the image of the object formed by the image forming lens is captured by the light receiving element.

The output of the light receiving element is processed by a signal processor controlled by a central processing unit for conversion into digital image information. The image information digitized by the signal processor is subjected to a predetermined image processing step by an image processor controlled also by the central processing unit, and subsequently recorded in a semiconductor memory such as a non-volatile memory. In this case, the semiconductor memory can be a memory card or a semiconductor memory contained in a camera body. A liquid crystal monitor can display the image as photographed or an image recorded in the semiconductor memory. Further, the images recorded in the semiconductor memory can also be transmitted to outside through a communication card, etc.

The camera or portable information terminal as described above can employ the aforesaid image forming lens of this invention as an imaging optical system.

Therefore, a small-sized electronic camera or portable information terminal with high image quality can be obtained.

In this case, the portable information terminal can capture an image with high quality and transmit the image to outside.

What is claimed is:

1. An image forming lens comprising a stop and a single lens placed in this order from the object side, wherein if the object-side surface of the single lens having paraxial curvature radii to form biconvex surfaces is referred to as the first surface while the image-side surface is referred to as the second surface, both said first surface and said second surface of said single lens have an aspherical shape, and the following conditional expressions are satisfied:

$0.18<d0/f<0.25$  (1)

$0.60<R1/f<0.85$  (2)

$1.40<L0/f<1.55$  (3)

where f: focal length d0: the distance from the stop to the first surface of the lens R1: the curvature radius of the first surface of the lens
L0: the distance from the stop to the focal points.

2. The image forming lens according to claim 1, wherein if the height at which the light intersects the surface is referred to as h, the aspherical shapes of the first and second surfaces of the single lens satisfy the following conditions:

said first surface is such that its curvature radius becomes gradually smaller compared to the spherical surface with the paraxial curvature radius and that at h=0.42f, it satisfies the following equation: 0.03<(difference between the spherical surface with the paraxial curvature radius and the aspherical shape of the first surface)/f<0.05 (4)

said second surface is such that its curvature radius becomes gradually larger compared to the spherical surface with the paraxial curvature radius, that it changes in shape from a convex surface to a concave surface at about h=0.32f, and that at h=0.42f, it satisfies the following equation: 0.14<(difference between the spherical surface with the paraxial curvature radius and the aspherical shape of the second surface)/f<0.18 (5).

3. The image forming lens according to claim 1 or 2, wherein as moldable glass material for minimizing the chromatic aberration and for acquiring heat resistance, FK5 (S-FSL5) satisfying the following conditional expressions is used:

$$1.48 < nd < 1.52 \quad (6)$$

$$vd > 68 \quad (7).$$

4. The image forming lens according to claim 1 or 2, wherein as moldable glass material for minimizing the chromatic aberration and for acquiring heat resistance, BK7 (L-BSL7) satisfying the following conditional expressions is used:

$$1.48 < nd < 1.52 \quad (6)$$

$$vd > 63 \quad (8).$$

5. A portable information terminal comprising the image forming lens as set forth in any one of claim 1 or 2, as a component of the imaging optical system of a camera's functional portion.

* * * * *